(12) United States Patent
Tomoda

(10) Patent No.: US 11,917,328 B2
(45) Date of Patent: Feb. 27, 2024

(54) COMMUNICATION DEVICE, CABLE DEVICE, AND DISPLAY DEVICE

(71) Applicant: KABUSHIKI KAISHA TOSHIBA, Tokyo (JP)

(72) Inventor: Ichiro Tomoda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 381 days.

(21) Appl. No.: 17/187,430

(22) Filed: Feb. 26, 2021

(65) Prior Publication Data

US 2022/0021843 A1    Jan. 20, 2022

(30) Foreign Application Priority Data

Jul. 14, 2020    (JP) .................................. 2020-120391

(51) Int. Cl.
*G06F 13/20*    (2006.01)
*H04N 7/10*    (2006.01)

(52) U.S. Cl.
CPC ............ *H04N 7/102* (2013.01); *G06F 13/20* (2013.01)

(58) Field of Classification Search
None
See application file for complete search history.

(56) References Cited

U.S. PATENT DOCUMENTS

| | | | | |
|---|---|---|---|---|
| 8,253,859 B2* | 8/2012 | Suzuki | .................. | H04N 7/081 370/464 |
| 8,457,153 B2* | 6/2013 | Nguyen | ................. | G09G 5/006 370/464 |
| 8,776,163 B2* | 7/2014 | Cirstea | .................. | H04N 7/106 725/127 |
| 10,462,418 B2* | 10/2019 | Won | .................... | G01R 31/2812 |
| 10,771,735 B2* | 9/2020 | Wen | ....................... | H04N 7/102 |
| 10,868,624 B2* | 12/2020 | Shintani | .................. | H04N 7/22 |
| 2019/0064899 A1 | 2/2019 | Doi et al. | | |

FOREIGN PATENT DOCUMENTS

| | | |
|---|---|---|
| JP | 2016-119563 A | 6/2016 |
| JP | 2019-46066 A | 3/2019 |

OTHER PUBLICATIONS

NXP, "UM10204: I2C Bus Specification and User Manual," Rev. 6-4, https://www.nxp.com/docs/en/user-guide/UM10204.pdf, 64 pages (2014).

* cited by examiner

*Primary Examiner* — Elias Mamo
(74) *Attorney, Agent, or Firm* — Finnegan, Henderson, Farabow, Garrett & Dunner, LLP

(57) ABSTRACT

According to one embodiment, a communication device includes: a voltage detector configured to detect a voltage from a first signal line to which the communication device and a master device are connected; and a controller configured to output, in case of detecting a read-out command from a second signal line to which the communication device and the master device are connected, a first signal with a time length corresponding to a value of the voltage to a third signal line to which the communication device and the master device are connected, and output, in case that a first signal is not detected on the third signal line from another communication device different from the master device after output of the first signal ends, a second signal including information corresponding to the read-out command to the second signal line.

12 Claims, 9 Drawing Sheets

COMMUNICATION DEVICE, CABLE DEVICE, AND DISPLAY DEVICE

CROSS REFERENCE TO RELATED APPLICATIONS

This application is based upon and claims the benefit of priority from the prior Japanese Patent Application No. 2020-120391, filed on Jul. 14, 2020, the entire contents of which are incorporated herein by reference.

FIELD

Embodiments described herein relates to a communication device, a cable device, and a display device.

BACKGROUND

In wired data transmission by HDMI (High Definition Media Interface) or the like, it has recently come to be performed to give a transmitter or a receiver connected to a cable a function of acquiring cable information. This is realized as follows. A nonvolatile memory and a communication microcomputer are provided inside the cable to form a cable device, and cable information concerning what function and performance the cable has is stored in the nonvolatile memory. When the cable device is connected to a transmitter or a receiver, the transmitter or the receiver reads the cable information from the microcomputer of the cable device. The operation is generally realized by issuing a data read-out command from a transmitter or a receiver, and the microcomputer of the cable device that receives the command reading the cable information stored in the nonvolatile memory and responding. The transmitter or the receiver selects the function such as a communication speed, and power supply based on the cable information, and performs communication via the cable.

However, when two or more cable devices are connected in series, microcomputers of the plurality of cable devices may simultaneously transmit response signals to a read-out command, and the response signals may collide. For example, when an address specified in the read-out command is the same for the microcomputers in both cables, the problem can occur. In this case, the transmitter or the receiver cannot correctly acquire the cable information.

The data read-out command is received not only by the microcomputer of the cable device but also by the transmitter or the receiver. Consequently, when the address specified in the data read-out command is the same for the microcomputer of the cable device, and the receiver or the transmitter, response signals are simultaneously transmitted from both of them. In this case, the response signals collide, and the transmitter or the receiver cannot correctly acquire the cable information.

DETAILED DESCRIPTION

According to one embodiment, a communication device includes: a voltage detector configured to detect a voltage from a first signal line to which the communication device and a master device are connected; and a controller configured to output, in case of detecting a read-out command from a second signal line to which the communication device and the master device are connected, a first signal with a time length corresponding to a value of the voltage to a third signal line to which the communication device and the master device are connected, and output, in case that a first signal is not detected on the third signal line from another communication device different from the master device after output of the first signal ends, a second signal including information corresponding to the read-out command to the second signal line.

Hereinafter, an embodiment of the present invention will be described with reference to the drawings.

Figure 1:
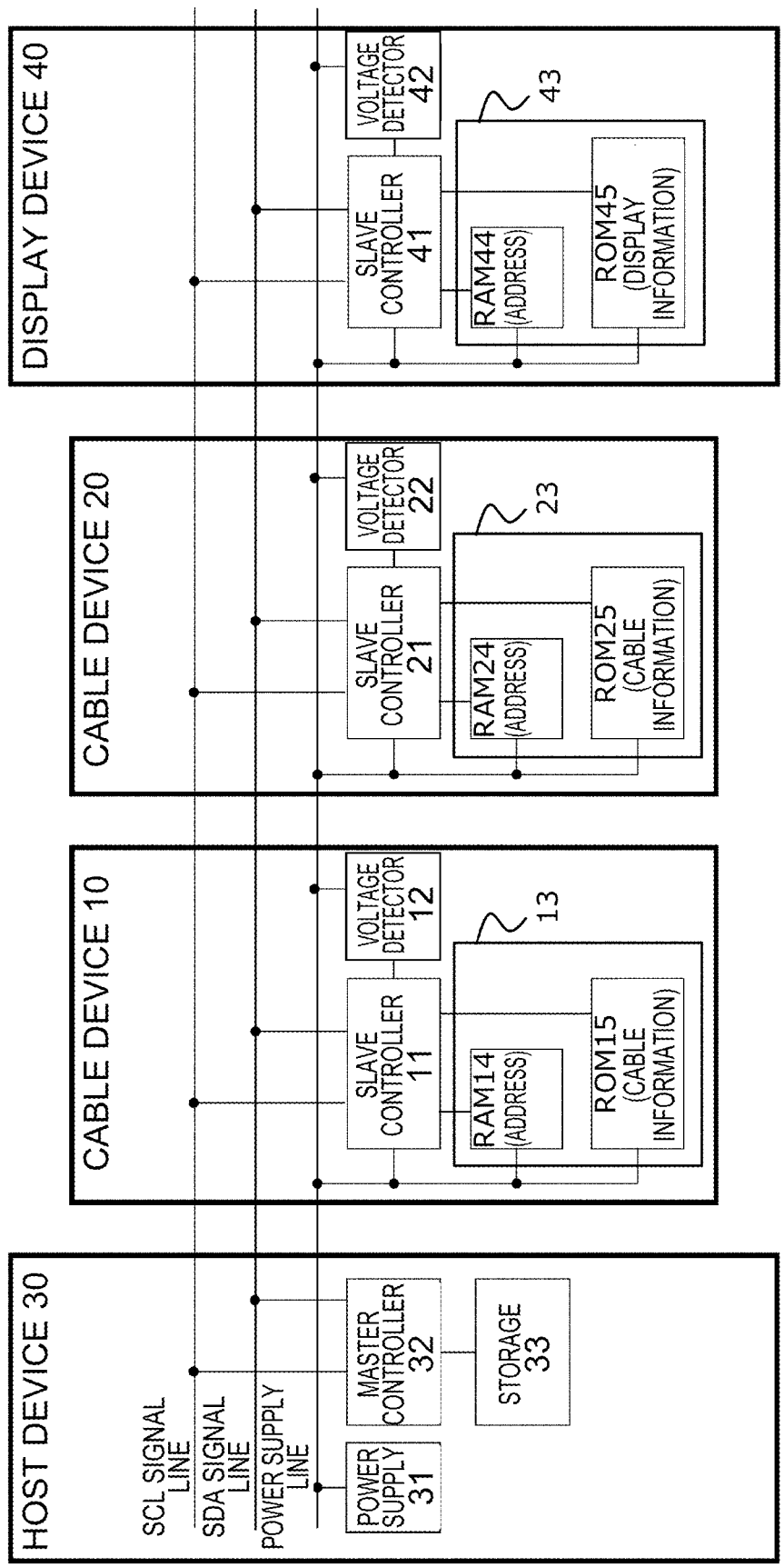
FIG. 1 is a block diagram of an entire configuration of a communication system according to the present embodiment.

FIG. 1 is a block diagram of an entire configuration of a communication system according to the present embodiment. The communication system in FIG. 1 includes two cable devices 10 and 20, a host device 30, and a display device 40. The host device 30 is a master device, and the cable device 10, the cable device 20, and the display device 40 are slave devices. There are the two cable devices, but the number of cable devices may be one, or three or more. The cable device 10 and the cable device 20 are connected in series, and the host device 30 is connected to the display device 40 via the cable device 10 and the cable device 20 that are connected in series.

In the present embodiment, the host device 30, the cable device 10, the cable device 20, and the display device 40 perform communication according to VESA Display Data Channel (DDC). DDC is a communication scheme used to exchange device information in interface standards such as HDMI or DisplayPort.

In the DDC specifications, a scheme based on I2C (Inter-Integrated Circuit) bus specifications is used as a communication channel. The I2C bus includes an SCL signal line that is a signal line for clock, and an SDA signal line that is a signal line for data. In the I2C bus, an operation based on a master/slave type protocol is performed, and in the DDC specifications, the host device 30 operates as the master device, and the display device 40 and the cable devices 10 and 20 operate as the slave devices. The SCL signal line corresponds to an example of a second signal line (or a first signal line) to which the respective slave devices are connected in common with the master device. The SDA signal line corresponds to an example of a third signal line (or the first signal line) to which the respective slave devices are connected in common with the master device.

The host device 30, the cable device 10, the cable device 20, and the display device 40 are connected in common to the SCL signal line, the SDA signal line, and a power supply line. The power supply line is a signal line configured to supply direct-current power from the host device 30 to the cable device 10, the cable device 20, and the display device 40. The power supply line is an example of the first signal line to which the respective slave devices (10, 20, 40) are connected in common with the master device.

The cable device 10 includes a connection interface (connector) configured to connect to the host device 30, and a connection interface configured to connect to the cable device 20. The cable device 20 includes a connection interface configured to connect to the cable device 10, and a connection interface configured to connect to the display device 40. In the present embodiment, the host device 30 is connected to the display device 40 via the two cable devices, but may be connected to the display device 40 via only one cable device.

[Host Device 30]

In FIG. 1, the host device 30 is a source device configured to provide video data, audio data, or both of these data to the display device 40 via the cable device 10 and the cable device 20. The host device 30 includes a master controller 31, a power supply 32, and a storage 33. The master controller 31 is a microcomputer configured to execute a protocol as the master of the I2C bus.

The power supply 32 supplies power (voltage and current) to the power supply line. The power supplied to the power supply line is used as an operation power of the cable device 10, the cable device 20, and the display device 40. The power supply line is not specified in the DDC specifications. In HDMI, a voltage of the power supply line is specified to be, for example, 5[V], and in the present embodiment, 5[V] can be used as the voltage of the power supply line. However, the present embodiment does not depend on the voltage value of the power supply line, and therefore the voltage of the power supply line may be another voltage.

The storage 33 stores information or data. The storage 33 includes a storage medium such as a volatile memory such as a RAM, a hard disk, or SSD (Solid State Drive) as an example. The storage 33 can read and write information or data by the master controller 31.

The master controller 31 sets an initial value (first address) of an address for read-out, and outputs a read-out command including the set address as a destination address via the SDA signal line, according to the I2C bus protocol. In data communication according to the I2C bus protocol, the master controller 31 outputs a clock to the SCL signal line. In synchronization with rising or falling timing of the clock, the master controller 31 or slave controllers 11, 21, and 41 outputs a signal (a high level signal or a low level signal) expressing "1" or "0" to the SDA signal line.

The master controller 31 receives a response signal including information corresponding to the read-out command according to the I2C bus protocol. The information corresponding to the read-out command is cable information when the device that transmits the response signal is the cable device 10 or the cable device 20, and is display information when the device that transmits the response signal is the display device 40.

The master controller 31 receives a response signal from one of the plurality of slave devices (10, 20, 40) with respect to the read-out command. The master controller 31 receives the response signal from the slave device with the largest (or smallest) voltage detected from the power supply line out of the slave devices having an address specified in the read-out command as an example. The master controller 31 may store information included in the response signal in the storage 33 by associating the information with an address of the slave device of a transmission source. When receiving the response signal, the master controller 31 changes the address for read-out by a method determined in advance (for example, increments by 1). The change method is same as a method by which the slave device that does not transmit a response signal out of the plurality of slave devices changes an address of the slave device. The master controller 31 outputs a read-out command including an address after change as the destination address via the SDA signal line according to the I2C bus protocol. The master controller 31 repeatedly performs change of the address for read-out, and output of the read-out command including the address after change as the destination address, until no response signal is received from any of the plurality of slave devices.

[Cable Device 10]

The cable device 10 includes a cable body (not illustrated), and a slave controller 11, a voltage detector 12, and a storage 13 that are housed in the cable body. The storage 13 includes a RAM (Random Access Memory) 14 and a ROM (Read Only Memory) 15. The cable device 10 drives the slave controller 11, the voltage detector 12, the RAM 14, and the ROM 15 based on the power supplied from the power supply line. The slave controller 11, the voltage detector 12, the RAM 14, and the ROM 15 are connected to the power supply line. The slave controller 11 is connected to the SCL signal line and the SDA signal line.

The slave controller 11 is a microcomputer configured to execute a protocol of a slave of the I2C bus, and controls the entire cable device 10.

The voltage detector 12 detects a voltage of the power supply line, and provides a value of the detected voltage to the slave controller 11. The voltage detector 12 is configured by an analog circuit, a digital circuit, or a combination of these circuits.

In the ROM 14, cable information of the cable device 10 is stored. The cable information includes information concerning a function and performance supported by the cable device 10. As described later, the host device 30 reads the cable information of the cable device 10 via the I2C bus. The host device 30 performs communication using the cable device 10 within a range supported by the cable device 10 based on the cable information.

The cable information includes the maximum value of a communication speed, or a value indicating a category corresponding to the maximum value, as an example. As an example of the maximum value, 4.9 Gbps, 18 Gbps, 48 Gbps or the like is cited. As another example of the cable information, there is a bit of whether or not to support a function of transmitting Ethernet. There is also a bit indicating whether or not to support a function of an HDMI Ethernet channel (function of transmitting Ethernet by using an HDMI cable) or an Audio return channel (function of transmitting surround sound or the like to an AV amplifier or the like). Further, there is also a bit indicating whether or not the cable device needs to receive supply of power to power up the power supply line as an option from the host device. In addition, there is information such as an ID number representing a maker of the cable device, and a product name of the cable device.

The RAM 15 stores the address of the cable device 10 in the I2C bus. The RAM 15 is a storage configured to store the address. The address is a value expressed by a plurality of bits. The address is rewritable by the slave controller 11. The RAM 15 may be a volatile memory or an involatile memory.

When the slave controller 11 detects a read-out command (a first read-out command or a second read-out command) from the host device 30 on the SDA signal line, the slave controller 11 determines whether a destination address of the read-out command corresponds to the address stored in the RAM 15. When the destination address corresponds to the address stored in the RAM 15, the slave controller 11 generates a clock stretch signal with a time length (back off time) corresponding to a value of the voltage detected in the voltage detector 12, and outputs the generated clock stretch signal to the SCL signal line. The clock stretch signal is a signal to keep the SCL signal at a low level. The clock stretch signal corresponds to a first signal with the time length corresponding to the value of the voltage detected in the voltage detector 12.

The back off time has a larger value as the value of the detected voltage is larger, as an example. For example, when the voltage value is X, and the back off time is Y, the back off time Y can be expressed by a monotonically increasing function of the voltage value X. An example of an expression of calculating the back off time by the monotonically increasing function is shown in expression (1) as follows.

$$Y[ms]=X[V]*10[ms/V] \qquad (1)$$

The back off time may have a smaller value as the value of the detected voltage is larger. In this case, the back off time can be expressed by a monotonically decreasing function of the voltage value, as an example.

After completion of the output of the clock stretch signal, the slave controller 11 determines whether clock stretch signals (first signals) from the other slave devices (the cable device 20, the display device 40) are detected on the SCL signal line. When no clock stretch signal is detected, the slave controller 11 reads the cable information stored in the ROM 14. The slave controller 11 transmits a response signal (second signal) including the cable information as information corresponding to the read-out command to the host device 30 via the SDA signal line according to the I2C bus protocol.

The slave controller 11 updates the address stored in the RAM 15 when the clock stretch signals from the other slave devices are detected. When the first address is stored in the RAM 15 as the initial address, the slave controller 11 changes the first address to a second address. A method for changing the address is the same as methods of the other slave devices (the cable device 20, the display device 40), and is also the same as the method for changing the address specified in the read-out command by the host device 30. After changing the address, the slave controller 11 repeatedly performs the same process as described above each time the slave controller 11 receives the read-out command from the host device 30.

[Cable Device 20]

The cable device 20 includes a slave controller 21, a voltage detector 22, and storage 23. The storage 23 includes a RAM 24 and a ROM 25. The cable device 20 drives the slave controller 21, the voltage detector 22, the RAM 24, and the ROM 25 based on the power supplied from the power supply line. The slave controller 21, the voltage detector 22, the RAM 24, and the ROM 25 are connected to the power supply line. The slave controller 21 is connected to the SCL signal line and the SDA signal line.

The slave controller 21 is a microcomputer configured to execute a protocol of the slave of the I2C bus, and controls the entire cable device 20.

The voltage detector 22 detects a voltage of the power supply line, and provides a value of the detected voltage to the slave controller 21. The voltage detector 22 is configured by an analog circuit, a digital circuit, or a combination of these circuits.

In the ROM 24, cable information of the cable device 20 is stored. The cable information includes information concerning a function and performance which the cable device 20 supports. As described later, the host device 30 reads the cable information of the cable device 20 via the I2C bus. The host device 30 performs communication using the cable device 20 within a range supported by the cable device 20 based on the cable information.

The RAM 25 stores the address of the cable device 20 in the I2C bus. The RAM 25 is a storage configured to store the address. The address is a value expressed by a plurality of bits. The address is rewritable by the slave controller 21. The RAM 25 may be a nonvolatile memory or a volatile memory.

When the slave controller 21 detects a read-out command (a first read-out command or a second read-out command) from the host device 30 on the SDA signal line, the slave controller 21 determines whether a destination address of the read-out command corresponds to the address stored in the RAM 25. When the destination address corresponds to the address stored in the RAM 25, the slave controller 21 generates a clock stretch signal with a time length (back off time) corresponding to a value of a voltage detected in the voltage detector 22, and outputs the generated clock stretch signal to the SCL signal line. The clock stretch signal corresponds to a first signal with the time length corresponding to the value of the voltage detected in the voltage detector 22. Details of calculation of the back off time are similar to the aforementioned content.

After completion of the output of the clock stretch signal, the slave controller 21 determines whether clock stretch signals (first signals) from the other slave devices (the cable device 10, the display device 40) are detected on the SCL signal line. When no clock stretch signal is detected, the slave controller 21 reads the cable information stored in the ROM 24. The slave controller 21 transmits a response signal (second signal) including the cable information as information corresponding to the read-out command to the host device 30 via the SDA signal line according to the I2C bus protocol.

The slave controller 21 updates the address stored in the RAM 25 when the clock stretch signals from the other slave devices are detected. When the first address is stored in the RAM 25 as the initial address, the slave controller 21 changes the first address to a second address. A method for changing the address is the same as methods of the other slave devices (the cable device 10, the display device 40), and is also the same as the method for changing the address specified in the read-out command by the host device 30. After changing the address, the slave controller 21 repeatedly performs the same process described above each time the slave controller 21 receives the read-out command from the host device 30.

[Display Device 40]

The display device 40 is a sink device configured to display video data received via the cable device 10 and the cable device 20 from the host device 30 on a screen. The display device 40 may include a function of receiving audio data from the host device 30, and reproducing the audio data. The display device 40 is an example of an output device configured to output data such as video or audio.

The display device 40 includes a slave controller 41, a voltage detector 42, and a storage 43. The storage 43 includes a RAM 44, and a ROM 45. The display device 40 drives the slave controller 41, the voltage detector 42, the RAM 44 and the ROM 45 based on the power supplied from the power supply line. The slave controller 41, the voltage detector 42, the RAM 44, and the ROM 45 are connected to the power supply line. The slave controller 41 is connected to the SCL signal line and the SDA signal line.

The slave controller 41 is a microcomputer configured to execute a protocol of the slave of the I2C bus, and controls the entire display device 40.

The voltage detector 42 detects a voltage of the power supply line, and provides a value of the detected voltage to the slave controller 41. The voltage detector 42 is configured by an analog circuit, a digital circuit, or a combination of these circuits.

In the ROM 44, display information of the display device 40 is stored. The display information includes information concerning a function and performance which the display device 40 supports. As described later, the host device 30 reads the display information via the I2C bus. The host device 30 performs communication with the display device 40 within a range supported by the display device 40 based on the display information. The display information includes a recommended resolution, a refresh rate, an aspect ratio, a maker, a model number, a serial number and the like, as examples.

The RAM 45 stores the address of the display device 40 in the I2C bus. The RAM 45 is a storage configured to store the address. The address is a value expressed by a plurality of bits. The address is rewritable by the slave controller 41. The RAM 45 may be a nonvolatile memory or a volatile memory.

When the slave controller 41 detects a read-out command (a first read-out command or a second read-out command) from the host device 30 on the SDA signal line, the slave controller 41 determines whether a destination address of the read-out command corresponds to the address stored in the RAM 25. When the destination address corresponds to the address stored in the RAM 45, the slave controller 41 generates a clock stretch signal with a time length (back off time) corresponding to a value of a voltage detected in the voltage detector 42, and outputs the generated clock stretch signal to the SCL signal line. The clock stretch signal corresponds to the first signal with the time length corresponding to the value of the voltage detected in the voltage detector 42. Details of calculation of the back off time are similar to the aforementioned content.

When the output of the clock stretch signal is completed, the slave controller 41 determines whether clock stretch signals (first signals) from the other slave devices (the cable devices 10, 20) are detected on the SCL signal line. When no signal is detected, the slave controller 41 reads the display information stored in the ROM 44. The slave controller 41 transmits a response signal (second signal) including the display information as information corresponding to the read-out command to the host device 30 via the SDA signal line according to the I2C bus protocol.

The slave controller 41 updates the address stored in the RAM 45 when the clock stretch signals from the other slave devices are detected. When the first address is stored in the RAM 45 as the initial address, the slave controller 41 changes the first address to a second address. A method for changing the address is the same as methods of the other slave devices (the cable devices 10, 20), and is also the same as the method for changing the address specified in the read-out command by the host device 30. After changing the address, the slave controller 41 repeatedly performs the same process as described above each time the slave controller 41 receives the read-out command from the host device 30.

Figure 2:
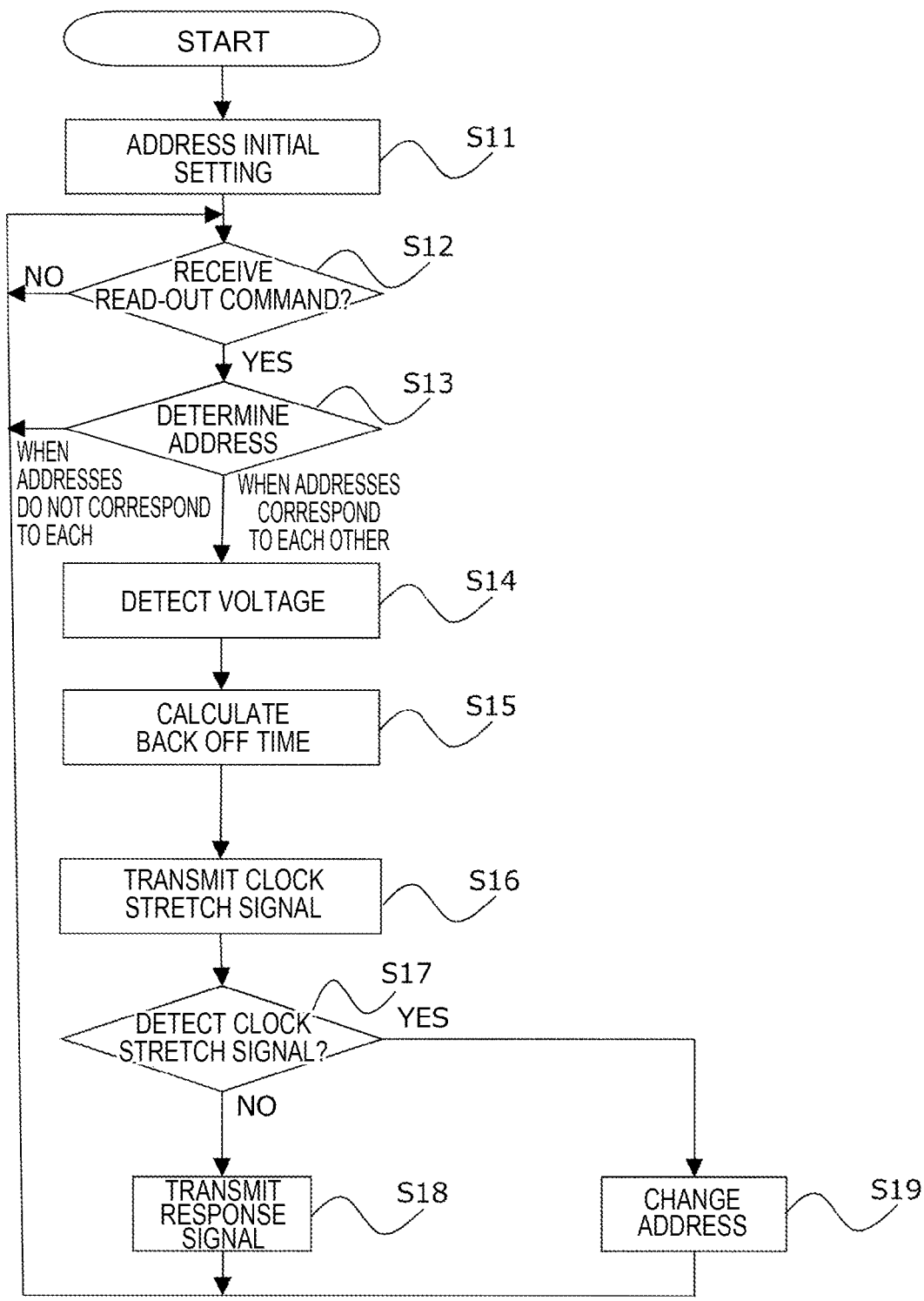
FIG. 2 is a flowchart of an example of an operation of a slave device in the communication system in FIG. 1.

FIG. 2 is a flowchart of an example of operations of the slave devices (the cable device 10, the cable device 20, the display device 40) in the communication system in FIG. 1.

In step S11 in FIG. 2, the cable device 10, the cable device 20, and the display device 40 store 0xA0 in the RAMs as initial values of the addresses of the own devices (S11). For example, the respective slave controllers may be programmed to store 0xA0 in the RAMs at the time of starting operations. Alternatively, the host device 30 may output a command instructing to store 0xA0 in the RAMs to the respective slave controllers by broadcast. The same address (0xA0) is stored in the RAMs of the respective devices 10, 20, and 40.

From the host device 30, a read-out command with a destination address 0xA0 is transmitted via the SDA signal line according to the I2C bus protocol. The slave controllers of the respective devices 10, 20, and 40 receive the read-out command from the host device 30 according to the I2C bus protocol (S12).

The slave controllers of the respective devices 10, 20, and 40 determine whether the address specified in the read-out command corresponds to the addresses of the own devices that are stored in the RAMs (S13). When the slave controllers determine that the address specified in the read-out command does not correspond to the addresses of the own devices, the slave controllers return to step S12. When the slave controllers determine that the address specified in the read-out command corresponds to the addresses of the own devices, the slave controllers proceed to step S14 of voltage detection. In the present example, all the slave controllers of the respective devices 10, 20, and 40 determine that the address specified in the read-out command corresponds to the addresses stored in the own devices, and proceed to step S14 of voltage detection.

In step S14, the slave controllers of the respective devices 10, 20, and 40 acquire a voltage of the power supply line by using the voltage detectors. The power supply line has a transfer loss, and therefore, as the power supply line is farther from the power supply, the voltage detected becomes smaller. In the present example, a voltage detected in the cable device 10 is the largest, and a voltage detected in the display device 40 is the smallest. For example, the voltage detected in the cable device 10 is 4.9[V], the voltage detected in the cable device 20 is 4.8[V], and the voltage detected in the display device 40 is 4.7[V].

The slave controllers of the respective devices 10, 20, and 40 calculate back off times that are lengths of clock stretch signals that are output to the SCL signal line based on the values of the acquired voltages (S15).

When the back off time is calculated by using expression (1) described above, for example, the back off time is calculated as 49 [ms] in the cable device 10, is calculated as 48 [ms] in the cable device 20, and is calculated as 47 [ms] in the display device 40.

The slave controller of each of the respective devices 10, 20, and 40 outputs the clock stretch signal with the time length of the calculated back off time to the SCL signal line (S16). The clock stretch signal is a signal that keeps the SCL signal line at a low level. Outputting the clock stretch signal is referred to as clock stretch. When the clock stretch signal is output, the host device 30 that is the master device cannot output a clock to the SCL signal line, and waits for release of the clock stretch.

The slave controller of each of the respective devices 10, 20, and 40 determines whether clock stretch signals from the slave controllers of the other devices are detected in the SCL signal line after outputting the clock stretch signal (S17). When the clock stretch signals from the slave controllers of the other devices are not detected, the slave controller of each of the devices 10, 20, and 40 determines that the own device has a right to respond to the read-out command from the host device 30.

Since the clock stretch signals of the respective devices 10, 20, and 40 have different back off times, the device that outputs the clock stretch signal of the longest time length does not detect the clock stretch signals from the other devices after completion of the output of the clock stretch signal from the own device. The remaining two devices detect the clock stretch signals from the other devices after completion of the output of the clock stretch signals from the own devices.

In the aforementioned example, the clock stretch signal of the cable device 10 is the longest, and therefore, the slave controller of the cable device 10 does not detect the clock stretch signals from the other devices on the SCL signal line after completion of the output of the clock stretch signal from the own device (NO in S17). The cable device 20 and the display device 40 detect the clock stretch signals from the other devices on the SCL signal line after completion of the output of the clock stretch signals from the own devices (YES in S17).

The device (here, the cable device 10) that determines that the clock stretch signals from the other devices are not detected transmits a response signal to the read-out command from the host device 30 according to the I2C bus protocol (S18). The response signal includes data (here, the cable information stored in the ROM of the cable device 10) stored in the ROM of the device. Thereby, in the master controller 31 of the host device 30, the cable information of the cable device 10 is acquired.

The devices (here, the cable device 20, the display device 40) that detect the clock stretch signal from the other device after completion of the output of the clock stretch signals do not transmit response signals, and change the addresses stored in the RAM of the own devices (S19). As an example, a predetermined value may be added to the address that is currently stored in the RAM. Here, 1 is added to the addresses stored in the RAMs, for example. As a result, the addresses of the devices 20 and 40 are both updated from 0xA0 to 0xA1. In other words, 0xA1 is stored in the RAM of the device 20, and 0xA1 is also stored in the RAM of the device 40.

Next, as a second round, a read-out command of a destination address 0xA1 is transmitted from the master controller 31 of the host device 30 via the SDA signal line according to the I2C bus protocol. The read-out command is received by the cable devices 10 and 20 and the display device 40 according to the I2C bus protocol (S12).

The slave controller of the cable device 10 determines that the destination address 0xA1 of the read-out command does not correspond to the address (0xA0) stored in the RAM of the own device (S13), and returns to step S12.

On the other hand, the cable device 20 and the display device 40 determine that the destination address 0xA1 of the read-out command corresponds to the address (0xA1) stored in the RAMs of the own devices (S13). Accordingly, the cable device 20 and the display device 40 perform detection of the voltage of the power supply line (S14), calculation of the back off times (S15), and output of the clock stretch signals having lengths of the calculated back off times (S16).

The cable device 20 and the display device 40 determine whether the other clock stretch signal is detected on the I2C bus after the own devices complete the output of the clock stretch signals (S17).

Since the clock stretch signal of the cable device 20 is longer than the clock stretch signal of the display device 40 here, the cable device 20 does not detect the other clock stretch signal on the I2C bus after the own device completes the output of the clock stretch signal (NO in S17). Accordingly, the slave controller of the cable device 20 determines that the own device has a right to transmit a response signal, and transmits the response signal including the cable information stored in the ROM of the own device to the host device 30 according to the I2C bus protocol (S18). Thereby, in the master controller 31 of the host device 30, the cable information of the cable device 20 is acquired.

On the other hand, the display device 40 detects the clock stretch signal output by the cable device 20 on the I2C bus after the own device completes the output of the clock stretch signal (YES in S17). Accordingly, the display device 40 does not transmit a response signal, and changes the address stored in the RAM of the own device to 0xA2 by incrementing the address by 1 (S19).

At this point of time, in the RAM of the cable device 10, 0xA0 is stored as the address of the own device, and in the RAM of the cable device 20, 0xA1 is stored as the address of the own device. Further, in the RAM of the display device 40, 0xA2 is stored as the address of the own device.

Thereafter, as a third round, a read-out command of a destination address 0xA2 is transmitted from the master controller 31 of the host device 30 via the SDA signal line according to the I2C bus controller. The read-out command is received in the cable devices 10 and 20, and the display device 40 according to the I2C bus protocol (S12).

The slave controllers of the cable devices 10 and 20 determine that the destination address 0xA2 of the read-out command does not correspond to the addresses (0xA0 and 0xA1) stored in the RAMs of the own devices (S13), and return to step S12.

On the other hand, the display device 40 determines that the destination address 0xA2 of the read-out command corresponds to the address (0xA2) stored in the RAM of the own device (S13). Accordingly, the display device 40 performs detection of the voltage of the power supply line (S14), calculation of the back off time (S15), and output of a clock stretch signal having a length of the calculated back off time (S16). The display device 40 determines whether the other clock stretch signal is detected on the I2C bus, after the own device completes the output of the clock stretch signal (S17).

Here, no device that outputs a clock stretch signal exists other than the display device 40, and the display device 40 does not detect the other clock stretch signal on the I2C bus after the own device completes the output of the clock stretch signal (NO in S17). Accordingly, the slave controller of the display device 40 determines that the own device has a right to transmit a response signal, and transmits the response signal including the display information stored in the ROM of the own device to the host device 30 according to the I2C bus protocol (S18). Thereby, in the master controller 31 of the host device 30, the display information of the display device 40 is acquired.

As a final result, in the master controller 31 of the host device 30, the cable information of the cable device 10, the cable information of the cable device 20, and the display information of the display device are acquired. In other words, the master controller 31 of the host device 30 can correctly acquire the information from each of the slaves without the response signals from the respective slave devices colliding with one another.

Figure 3:
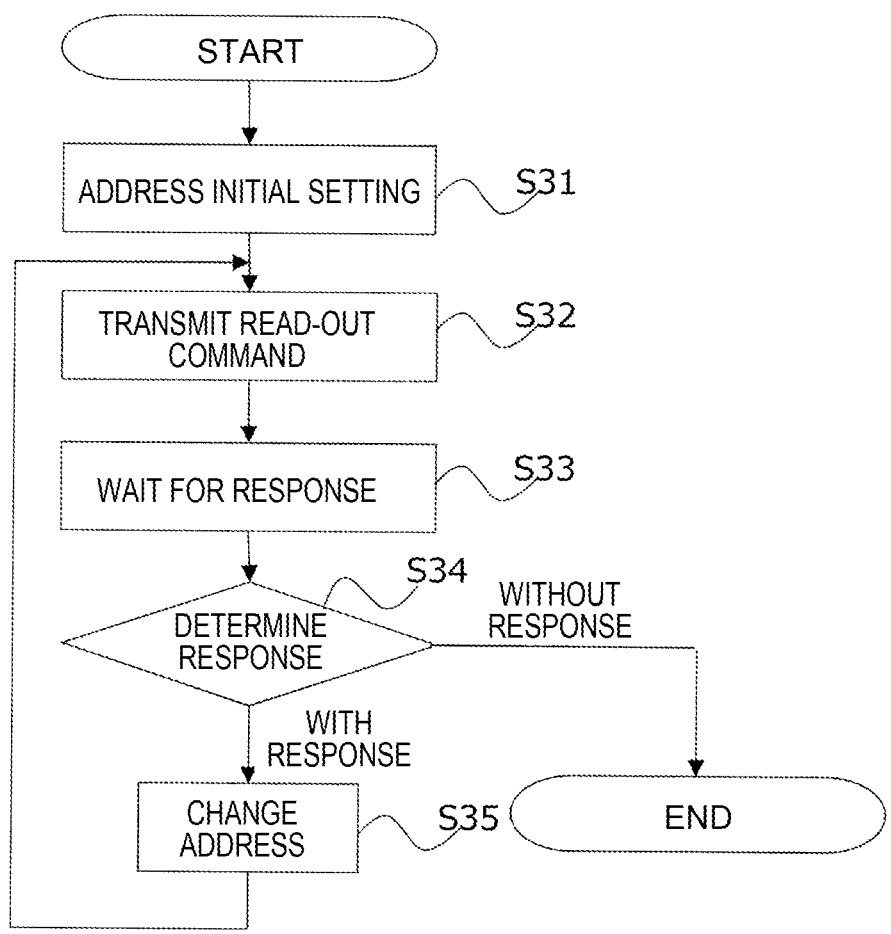
FIG. 3 is a flowchart of an example of an operation of a host device that is a master device in the communication system in FIG. 1.

FIG. 3 is a flowchart of an example of an operation of the host device 30 that is the master device in the communication system in FIG. 1. The master controller 31 of the host device 30 sets an initial value of an address for read-out (S31). Here, 0xA0 is set as the initial value of the address. The master controller 31 transmits a read-out command in which the initial value is specified as a destination address via the SDA signal line according to the I2C bus protocol (S32). The master controller 31 waits for a response signal from any of the slave devices (the cable device 10, the cable device 20, or the display device 40) connected to the I2C bus (S33). The master controller 31 ends the process when the master controller 31 does not receive the response signal even after a certain period of time or more elapses (NO in S34).

When the master controller 31 receives the response signal (S34), the master controller 31 stores information included in the response signal (the cable information, the display information or the like) in the storage 33 by associating the information included in the response signal with the address (0xA0 that is the address of the initial value) of the slave device of an acquisition source. The master controller 31 changes the address of the slave device that is used in read-out (S35). A changing method of the address may be arbitrary as long as the method is recognized in common with the respective slave devices connected to the I2C bus. As an example, a predetermined value may be added to the address used in read-out in step S32. Here, 1 is added to the address, for example. As a result, the address for use in read-out is updated from 0xA0 to 0xA1. Returning to step S32, the master controller 31 transmits a read-out command in which the updated address is specified as the destination address via the SDA signal line according to the I2C bus protocol. Hereinafter, the same process is repeated until it is determined that no response signal is received from any of the slave devices in step S34.

Figure 4:
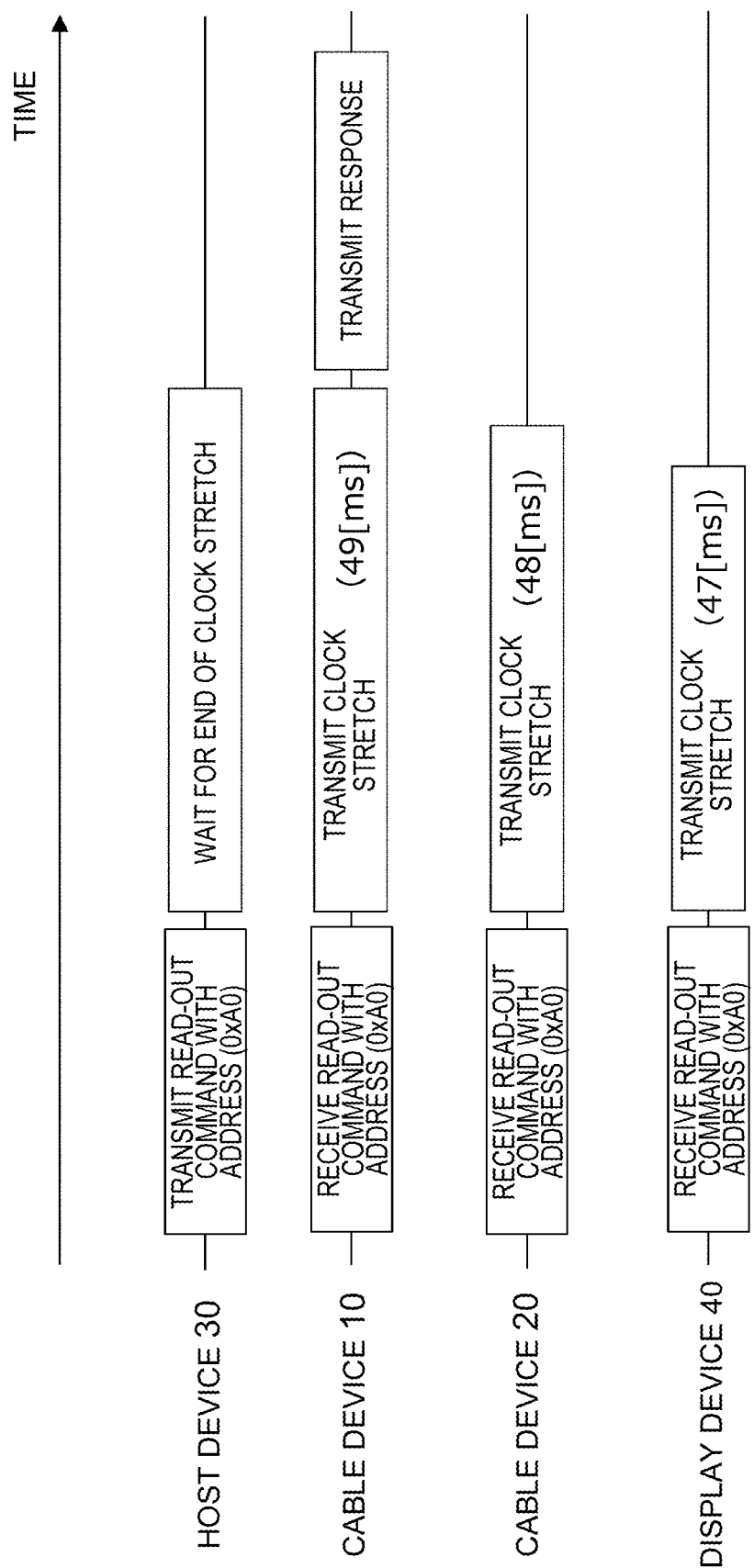
FIG. 4 is a diagram illustrating an example of an operation sequence of the communication system according to the present embodiment.
Figure 5:
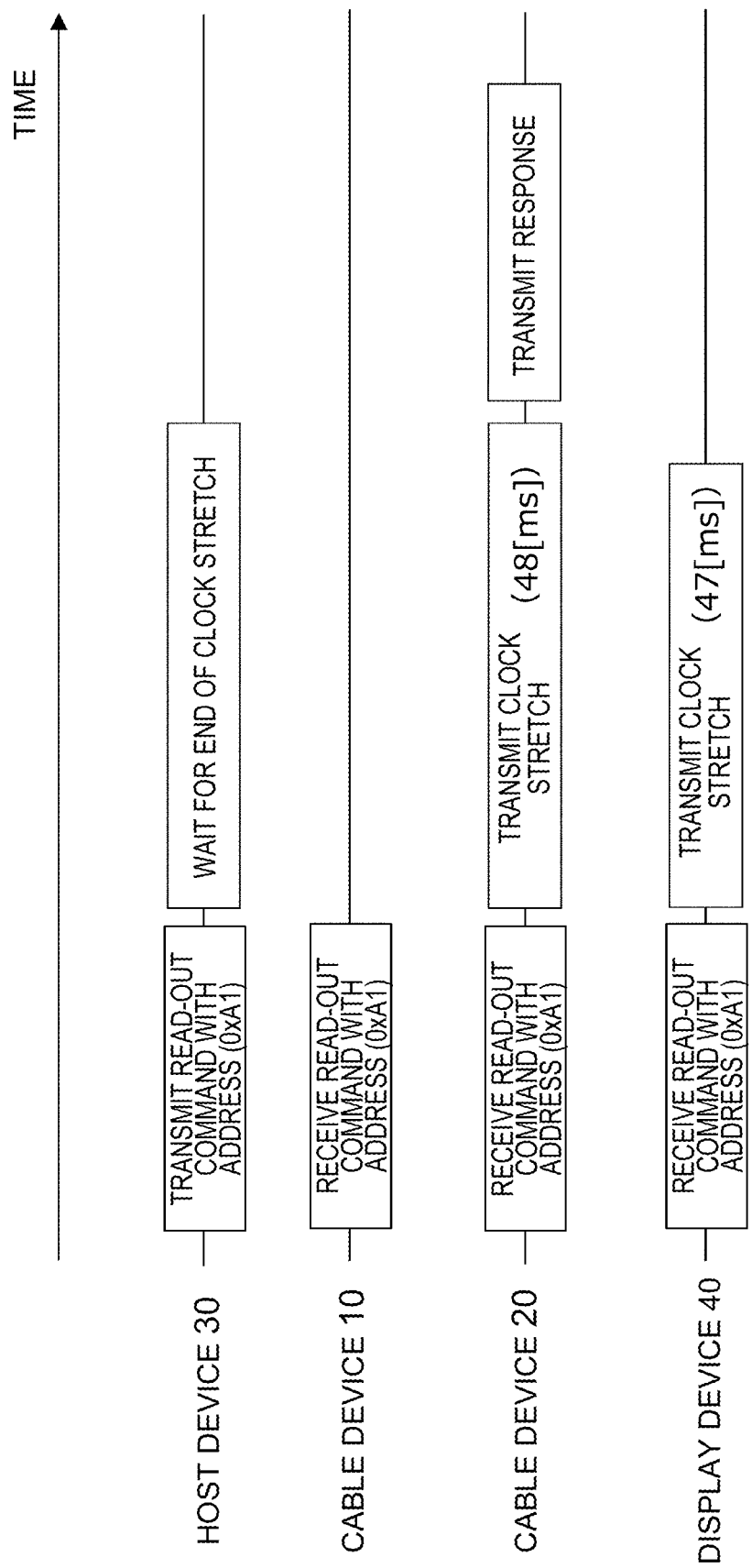
FIG. 5 is a diagram illustrating an example of an operation sequence following FIG. 4.
Figure 6:
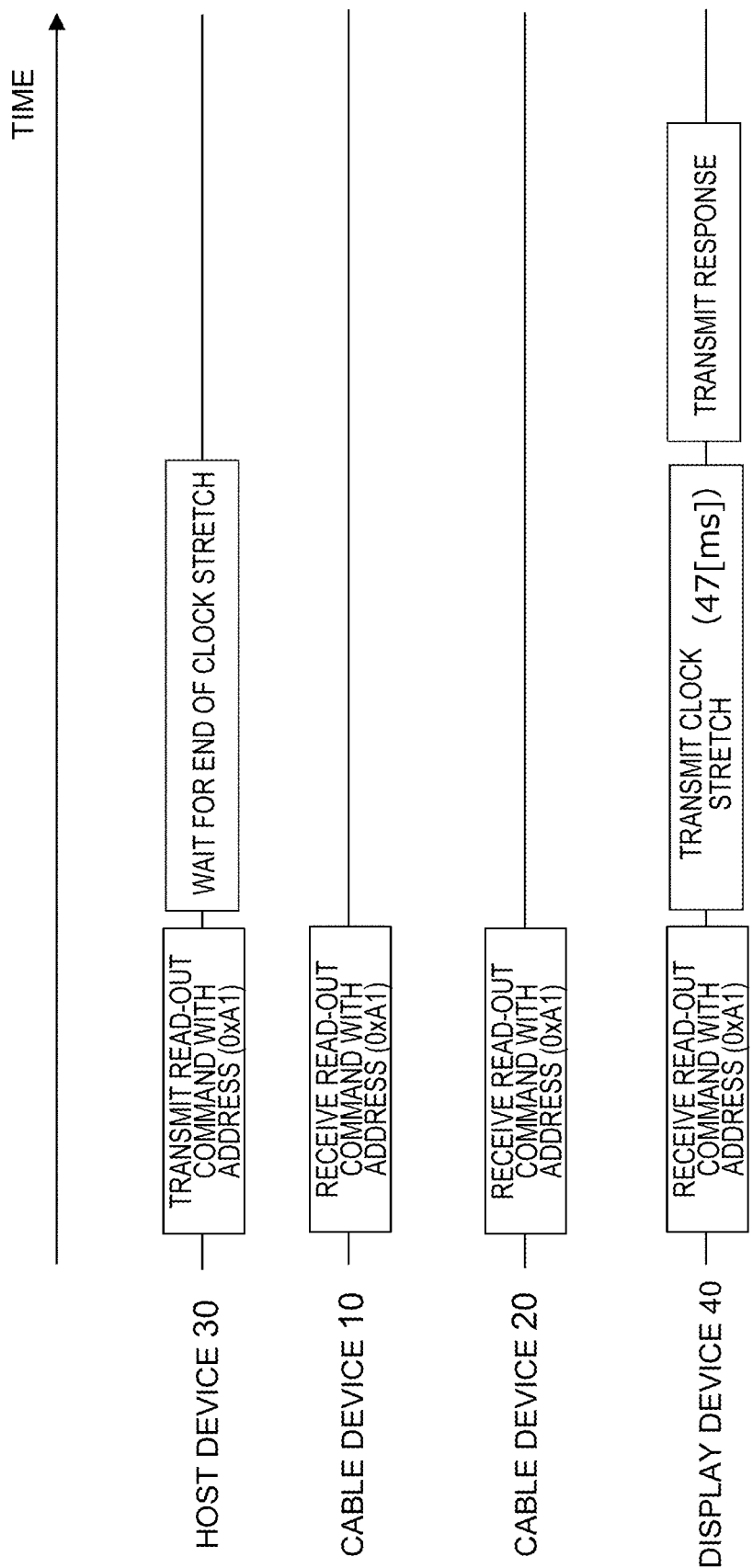
FIG. 6 is a diagram illustrating an example of an operation sequence following FIG. 5.

FIG. 4 illustrates an example of an operation sequence of the host device 30, the cable device 10, the cable device 20, and the display device 40. FIG. 5 is a diagram illustrating an example of an operation sequence following FIG. 4. FIG. 6 is a diagram illustrating an example of an operation sequence following FIG. 5. The operation sequences in FIG. 4 to FIG. 6 correspond to the specific examples described by using the flow charts in FIG. 2 and FIG. 3.

In FIG. 4, 0xA0 is stored in the respective RAMs of the cable device 10, the cable device 20, and the display device 40 as the initial value of the addresses of the own devices. The host device 30 transmits the read-out command in which 0xA0 is specified as the address, and the cable device 10, the cable device 20, and the display device 40 receive the read-out command.

The respective devices 10, 20, and 40 determine that the address of the read-out command corresponds to the addresses of the own devices. The respective devices 10, 20, and 40 detect voltages from the power supply line, and calculate back off times based on detected voltage values. Here, as the voltage value is larger, the length of the back off time is made larger.

The respective devices 10, 20, and 40 output the clock stretch signals having the calculated back off times to the SCL signal line. In this example, the cable device 10 outputs the clock stretch signal with the back off time of 49 [ms], the cable device 20 outputs the clock stretch signal with the back off time of 48 [ms], and the display device 40 outputs the clock stretch signal of the back off time of 47 [ms]. Timings at which the clock stretch signals are output from the respective devices 10, 20, and 40 are the same or substantially the same.

The display device 40 detects the clock stretch signal of the cable device 10 or the cable device 20 on the SCL signal line after the own device completes the output of the clock stretch signal. Accordingly, the display device 40 determines that the display device 40 does not have a right to respond to the read-out command, and does not transmit a response signal. The display device 40 increments the address stored in the RAM of the own device by 1. As a result, the address is updated to 0xA1.

The cable device 20 detects the clock stretch signal of the cable device 10 on the SCL signal line after the own device completes the output of the clock stretch signal. Accordingly, the cable device 20 determines that the cable device 20 does not have a right to respond to the read-out command, and does not transmit a response signal. The cable device 20 increments the address stored in the RAM of the own device by 1. As a result, the address is updated to 0xA1.

The cable device 10 does not detect the clock stretch signal from the other device on the SCL signal line after the own device completes the output of the clock stretch signal, and therefore determines that the cable device 10 has a right to respond to the read-out command. The cable device 10 reads the cable information stored in the ROM of the own device, and transmits the response signal including the cable information according to the I2C bus protocol. Note that the cable device 10 does not need to update the address stored in the RAM of the own device.

In FIG. 5, the host device 30 increments the address for use in read-out by 1 to change the address to 0xA1, and transmits a read-out command in which 0xA1 is specified as the destination address. The cable device 10, the cable device 20, and the display device 40 receive the read-out command.

The cable device 10 determines that the address of the read-out command does not correspond to the address of the own device, and performs nothing. The respective devices 20 and 40 determine that the address of the read-out command corresponds to the addresses of the own devices. The respective devices 20 and 40 detect voltages from the power supply line, and calculate back off times based on the detected voltage values. Here, as the voltage value is larger, the length of the back off time is made larger. Note that detection of the voltage value may be omitted, and the voltage value detected when the read-out command is received first may be reused. Alternatively, calculation of the back off time may be omitted, and the value of the back off time calculated first may be reused.

The respective devices 20 and 40 output the clock stretch signals having the calculated back off times to the SCL signal line. The cable device 20 outputs the clock stretch signal with the back off time of 48 [ms], and the display device 40 outputs the clock stretch signal with the back off time of 47 [ms]. Timings at which the clock stretch signals are output from the respective devices 20 and 40 are the same or substantially the same.

The display device 40 detects the clock stretch signal of the cable device 20 on the SCL signal line after the own device completes the output of the clock stretch signal. Accordingly, the display device 40 determines that the display device 40 does not have a right to respond to the read-out command, and does not transmit a response signal.

The display device 40 increments the address stored in the RAM of the own device by 1. As a result, the address is updated to 0xA2.

The cable device 20 does not detect the clock stretch signal from the other device on the SCL signal line after the own device completes the output of the clock stretch signal, and therefore determines that the cable device 20 has a right to respond to the read-out command. The cable device 20 reads the cable information stored in the ROM of the own device, and transmits the response signal including the cable information to the host device 30 according to the I2C bus protocol. Note that the cable device 20 does not need to update the address stored in the RAM of the own device.

In FIG. 6, the host device 30 increments the address for use in read-out by 1 to change the address to 0xA2, and transmits a read-out command in which 0xA2 is specified as the destination address. The cable device 10, the cable device 20, and the display device 40 receive the read-out command.

The cable devices 10 and 20 determine that the address of the read-out command does not correspond to the addresses of the own devices, and do nothing. The display device 40 determines that the address of the read-out command corresponds to the address of the own device. The display device 40 detects a voltage from the power supply line, and calculates a back off time based on the detected voltage value. Note that detection of the voltage value may be omitted, and the voltage value detected when the read-out command is received at a first or a second time may be reused. Calculation of the back off time may be omitted, and the value of the back off time calculated at the first or the second time may be reused.

The display device 40 outputs a clock stretch signal having the calculated back off time to the SCL signal line. The display device 40 outputs the clock stretch signal with a back off time of 47 [ms].

The display device 40 detects no clock stretch signal from the other device on the SCL signal line after the own device completes the output of the clock stretch signal, and therefore determines that the display device 40 has a right to respond to the read-out command. The display device 40 reads the display information stored in the ROM of the own device, and transmits the response signal including the display information to the host device 30 according to the I2C bus protocol.

By the above operation sequences, the host device 30 acquires the cable information of the cable device 10, the cable information of the cable device 20, and the display information of the display device 40.

According to the above operation sequences, the response signals from the respective slave devices do not collide with one another, and therefore the host device 30 can correctly receive the response signals from the respective slave devices.

Figure 7:
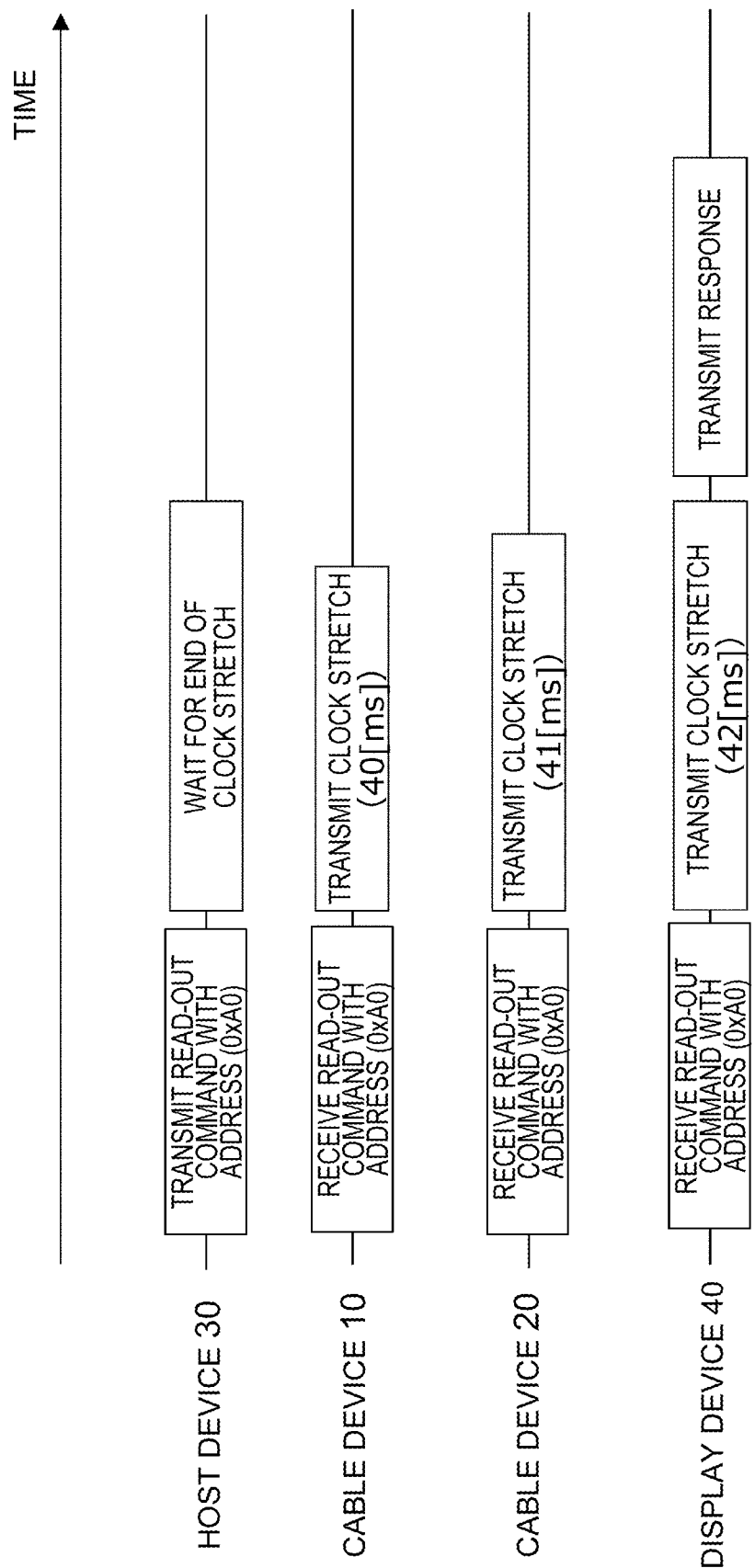
FIG. 7 is a diagram illustrating another example of the operation sequence of the communication system according to the present embodiment.
Figure 8:
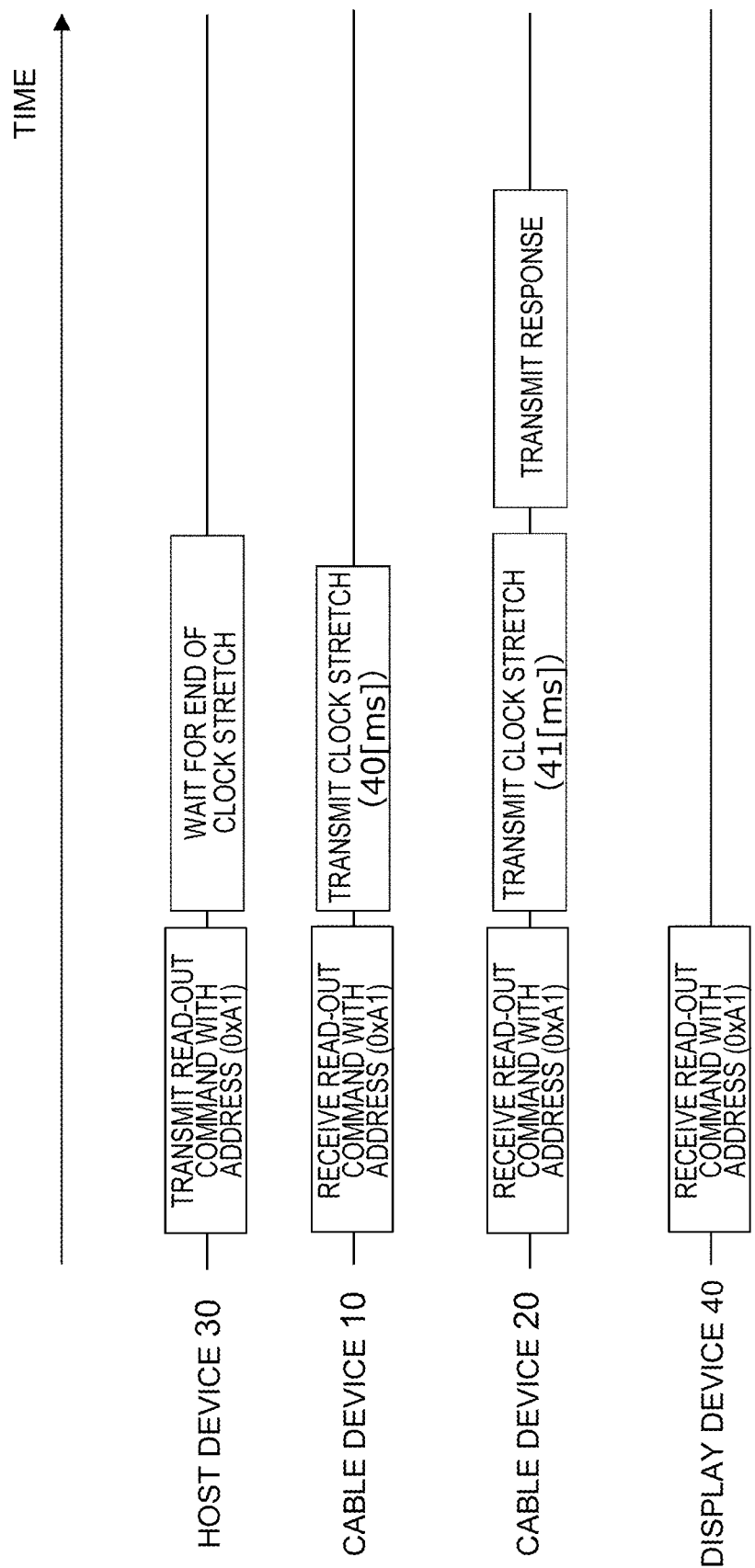
FIG. 8 is a diagram illustrating an example of an operation sequence following FIG. 7.
Figure 9:
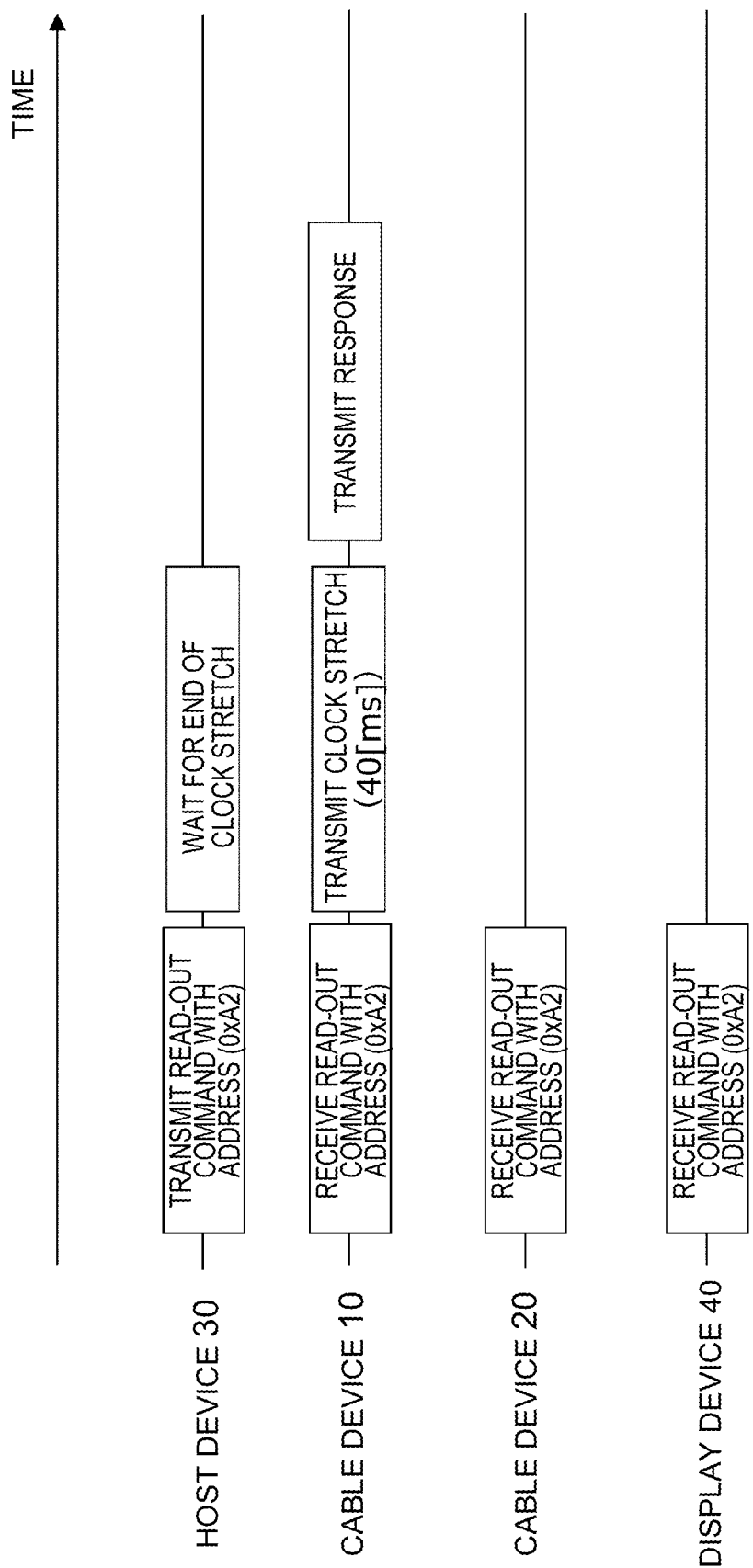
FIG. 9 is a diagram illustrating an example of an operation sequence following FIG. 8.

In the specific examples in FIG. 4 to FIG. 6, the back off times of the clock stretch signals are made longer as the voltage values detected in the voltage detectors are larger, but the back off times of the clock stretch signals may be made shorter as the voltage values detected by the voltage detectors are larger. Operation sequence examples in this case are illustrated in FIG. 7, FIG. 8, and FIG. 9.

In this case, as an expression to calculate the back off time, a monotonically decreasing function can be used. An example of the expression that calculates the back off time by the monotonically decreasing function is shown in expression (2) as follows.

$$Y[\text{ms}] = 1/X[\text{V}] * 200[\text{ms/V}] \tag{2}$$

The voltages detected in the respective devices 10, 20, and 40 are assumed to be 4.9 [V], 4.8 [V], and 4.7 [V]. When the back off time is calculated by using expression (2), the calculated back off time is 40 [ms] in the cable device 10, is 41 [ms] in the cable device 20, and is 42 [ms] in the display device 40 (fractions of the values calculated by expression (2) are rounded down).

As a result, as illustrated in FIG. 7, the display device 40 outputs the longest clock stretch signal, and the cable device 10 outputs the shortest clock stretch signal. Accordingly, the display device 40 transmits a response signal first. Next, as illustrated in FIG. 8, the cable device 20 transmits a response signal, and finally, as illustrated in FIG. 9, the cable device 10 transmits a response signal.

(Modification)

In the present embodiment, the voltage detectors of the respective devices 10, 20, and 40 detect the voltage of the power supply line, but may acquire a voltage of the SCL signal line or the SDA signal line. For example, the SCL signal line or the SDA signal line has a binary voltage (a high level signal, a low level signal), and therefore, a voltage of a high level signal may be detected from the SCL signal line or the SDA signal line, at a time of reception of a read-out command, for example. The back off times may be calculated in the respective devices 10, 20, and 40 based on values of the detected voltages.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device comprising:
   a voltage detector configured to detect a voltage from a first signal line to which the communication device and a master device are connected; and
   a controller configured to output, in case of detecting a read-out command from a second signal line to which the communication device and the master device are connected, a first signal with a time length corresponding to a value of the voltage to a third signal line to which the communication device and the master device are connected, and
   output, in case that a first signal is not detected on the third signal line from another communication device different from the master device after output of the first signal ends, a second signal including information corresponding to the read-out command to the second signal line.

2. The communication device according to claim 1, further comprising
   a storage configured to store a first address,
   wherein the controller
   outputs the first signal to the third signal line in case that the read-out command includes the first address,
   changes the first address stored in the storage to a second address in case that the first signal is detected on the third signal line from the other communication device, detects a second read-out command from the second signal line, outputs the first signal to the third signal line in case that the second read-out command includes the second address, and outputs the second signal to the second signal line in case that the first signal is not detected on the third signal line from the other communication device after output of the first signal ends.

3. The communication device according to claim 1, wherein the first signal line is a power supply line, the second signal line is a clock signal line, and the third signal line is a data signal line.

4. The communication device according to claim 1, wherein the second signal line is a clock signal line, the third signal line is a data signal line, and the first signal line is one of the data signal line and the clock signal line.

5. The communication device according to claim 1, wherein as the value of the voltage is larger, the time length of the first signal is larger.

6. The communication device according to claim 1, wherein as the value of the voltage is larger, the time length of the first signal is smaller.

7. The communication device according to claim 1, wherein the second signal line and the third signal line are I2C (Inter-Integrated Circuit) buses, and the first signal is a clock stretch signal specified in I2C bus specification.

8. The communication device according to claim 7, wherein each I2C bus is used as a DDC (Display Data Channel) that is one of VESA standards, the communication device and the other communication device are cable devices to connect between the master device and a display device, and the communication device and the other communication device are connected in series.

9. The communication device according to claim 1, wherein the communication device is a cable device, and the information corresponding to the read-out command includes cable information.

10. The communication device according to claim 1, wherein the communication device is a display device, and the information corresponding to the read-out command includes display information.

11. A cable device comprising:
a voltage detector configured to detect a voltage from a power supply line to which the cable device and a host device are connected; and
a controller configured to output, in case of detecting a read-out command from a data signal line to which the cable device and the host device are connected, a first signal with a time length corresponding to a value of the voltage to a clock signal line to which the cable device and the host device are connected, and
output, in case that a first signal is not detected on the clock signal line from another slave device different from the host device after output of the first signal ends, a second signal including cable information to the data signal line.

12. A display device comprising:
a voltage detector configured to detect a voltage from a power supply line to which the display device and a host device are connected; and
a controller configured to output, in case of detecting a read-out command from a data signal line to which the display device and the host device are connected, a first signal with a time length corresponding to a value of the voltage to a clock signal line to which the display device and the host device are connected, and
output, in case that a first signal is not detected on the clock signal line from another slave device different from the host device after output of the first signal ends, a second signal including display information to the data signal line.

* * * * *